United States Patent [19]
Edwards

[11] 3,911,744
[45] Oct. 14, 1975

[54] LIQUID LEVEL GAUGING APPARATUS

[75] Inventor: Harrison F. Edwards, Norwich, N.Y.

[73] Assignee: Liquidometer Corporation, Norwich, N.Y.

[22] Filed: Apr. 10, 1974

[21] Appl. No.: 459,574

[52] U.S. Cl. ............................... 73/304 R; 324/65 R
[51] Int. Cl.² .......................................... G01F 23/24
[58] Field of Search ............ 324/65 R, 65 P; 73/304

[56] References Cited
UNITED STATES PATENTS

| | | | |
|---|---|---|---|
| 1,831,898 | 11/1931 | Wignall | 73/304 R |
| 2,754,186 | 8/1973 | Sambhu | 324/65 R |
| 3,370,466 | 2/1968 | Chang | 73/304 R |
| 3,443,438 | 5/1969 | Martin et al. | 73/304 R |
| 3,530,711 | 9/1970 | Tocanne | 73/304 R |
| 3,552,209 | 1/1971 | Johnston | 73/304 R |
| 3,706,980 | 12/1972 | Maltby | 73/304 C |
| 3,771,548 | 11/1973 | Rauchwerger | 73/304 C |
| 3,777,257 | 12/1973 | Geisselmann | 72/304 C |
| 3,797,311 | 3/1974 | Blanchard et al. | 73/304 C |

*Primary Examiner*—Richard E. Aegerter
*Assistant Examiner*—John W. Shepperd
*Attorney, Agent, or Firm*—H. Gibner Lehmann; K. Gibner Lehmann

[57] ABSTRACT

A liquid level gauge which utilizes the electrical resistance of the liquid being gauged to provide readings. An immersion unit is adapted to be disposed vertically in the liquid storage vessel. It comprises an elongate conducting member coextensive with a row of insulatedly-mounted electrodes which latter are individually connected to an indicating type selector switch means. The conducting member is connected to one input of an extremely sensitive electronic amplifier, which in turn drives an output indicating meter. The indicating selector switch means can apply an exciting potential to any of the electrodes, which results in a driving signal applied to the amplifier only if the excited electrode is submerged. An indicator light signals the amplifier output under such circumstances.

By sweeping the selector switch means over its range and noting the point at which the indicator light becomes illuminated, it is possible to ascertain the location of the upper-most electrode which is submerged and thus determine the level of fluid in the tank. In addition, the indicating meter provides a reading corresponding to the percentage or portion of the electrode which is submerged, and thus gives a finer degree of accuracy to the level measurement.

34 Claims, 2 Drawing Figures

Fig. 1

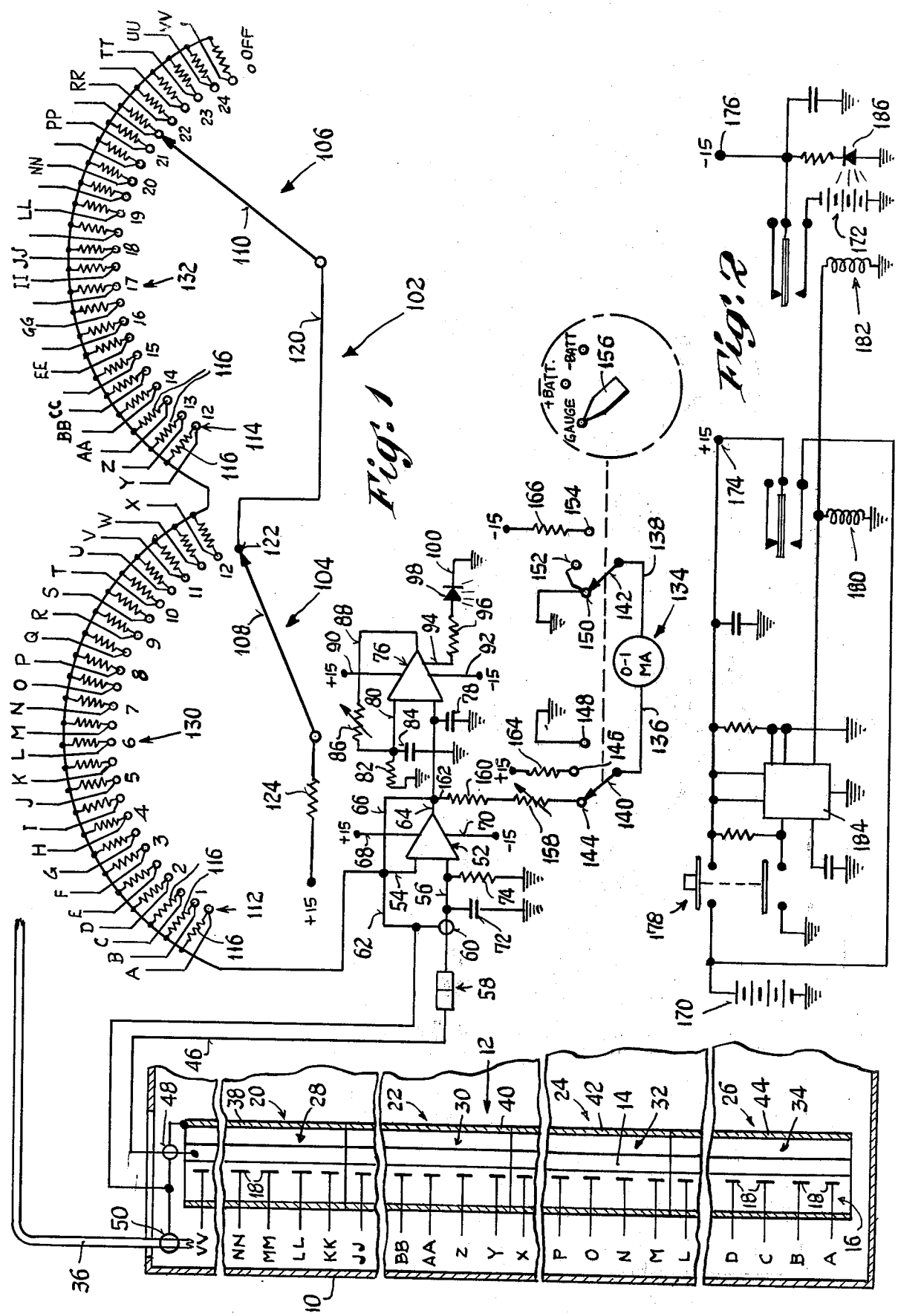

– 1 –

LIQUID LEVEL GAUGING APPARATUS

BACKGROUND

This invention relates to liquid gauging systems for determining the level of a liquid in a tank or container. Heretofore, various types of liquid gauges have been proposed and produced. One such system involved a column of mercury adapted to engage contacts disposed in a vertical row, so as to control a plurality of circuits connected thereto. The mercury column was influenced by pressure exerted on diaphragms at its top and bottom. The upper diaphragm responded to the pressure in the tank above the level of the liquid, whereas the lower diaphragm was disposed in a chamber connected to the bottom level of the tank and thus responded to the pressure existing there. A differential reading of the pressures was thus obtained, such a reading being independent of the absolute pressure outside the tank. While this system operated satisfactorily in some circumstances, it was not capable of a high accuracy due to limitations in the deflection of the diaphragms. Also, the weight of the mercury acted against the weight of the liquid being gauged, and accordingly, liquids of different specific gravity would result in different readings which were erroneous.

Another prior system involved the establishment of a potential gradient in the liquid being gauged, in conjunction with a sensing probe arrangement and an electrical circuit which utilized the voltage gradient in conjunction with the liquid level to produce level readings. Such an arrangement involved ionic currents induced in the fluid by the potential gradient and operated by measuring the average probe potential, which at any time equaled one-half the potential existing at the surface of the fluid. This system also had drawbacks in that it lacked accuracy and depended on values of voltage gradient which could not be accurately maintained and which varied with the conductivity of different liquids.

Still other prior gauging devices employed systems incorporating floats or similar movable members or systems depending on the specific gravity as well as the conductivity of the liquid being gauged. These prior systems all had drawbacks since the gauging was adversely affected by changes in the viscosity, density or conductivity of the particular liquid being gauged.

SUMMARY

The above drawbacks and disadvantages of prior liquid level gauging devices are obviated by the present invention, which has for its main object the provision of an improved liquid level gauge which is especially accurate in providing precision readings, the accuracy of the readings being attainable in spite of changes in the liquid or in the liquid's viscosity, density, conductivity, etc. A related object of the invention is to provide an improved liquid level gauge as above set forth, which is especially simple in its construction, whereby there is had a low cost, and which is characterized by a reliable and service-free operation over an extended period of usage or time. A further object is the provision of an improved gauge as above set forth, wherein both a coarse, digital reading of the level can be obtained quickly, and a finer, higher accuracy analog reading obtained thereafter to provide overall accuracy better than 0.5%, depending on the number of electrodes employed.

These objects are accomplished by a gauging system involving a highly sensitive electronic amplifier having a high impedance input circuit in conjunction with a stepped-contact immersion unit (or probe) having related guard or shielding means, together with a circuit switching device which simultaneously supplies a polarizing potential to any of said contacts and indicates the contacts or electrodes being so polarized (or designated). In association with such switching device and amplifier, there is a stepless indicating meter or analog device such as a milliammeter, responsive to the power output of the amplifier and so arranged that it can function to intercalatate the readings of the switch device so as to enable accurate interpolation between the stepped values. The contacts or electrodes are also connected respectively (through high value resistors) to the output terminal of the amplifier, such that in the absence of a polarizing potential applied to a particular electrode, the latter assumes a potential equal to the output voltage of the amplifier.

An elongate conducting member which is coextensive with the row of electrodes is connected to one input terminal of the amplifier, and the circuit switching device, energized from a battery or power supply, comprises one or several switch arms or blades arranged to apply a polarizing potential to any of the contacts or electrodes and to indicate which are being polarized at any particular time. The amplifier output drives not only the stepless meter, but also excites a second amplifier which controls a light-emitting source whereby a visual indication is had of the amplifier function as the switching device is being actuated. All portions of the system with the exception of the immersion unit or probe are located externally of the tank containing the liquid whose level is to be gauged, and such location may be at a point remote from the tank, as desired.

The structure of the electrodes and associated shielding means and cooperable conducting member is simple and foolproof; the circuit switching device and amplifier circuitry are likewise simple and responsive while at the same time being extremely accurate whereby there is had an especially advantageous system of great accuracy, reliability, adaptability to various installations, and low cost.

Still other features and advantages will hereinafter appear.

In the drawings, illustrating an embodiment of the invention:

FIG. 1 is a schematic circuit diagram and diagrammatic representation of the present improved gauging system.

FIG. 2 is a diagrammatic representation of the liquid gauging power control provided by the invention, for use with the gauging system of FIG. 1.

Considering first FIG. 1, there is illustrated a tank or container 10 which may, for example, be an oil storage tank having a capacity of thousands of gallons of fuel oil, gasoline or other liquid petroleum products.

In accordance with the present invention, there is disposed in the tank 10 a probe unit or immersion unit designated generally by the numeral 12, such unit comprising an upright electrically conducting probe or member 14 which is adapted for contact at a multiplicity of levels with the liquid which is to be gauged. Arranged alongside the conducting member 14 is a cooperable probe device comprising an upright row 16 including a multiplicity of contacts or electrodes (or blades) 18 which are uniformly spaced one above another and insulated from each other. The blades 18 have finite vertical dimensions and are exposed for contact with the liquid in the tank 10. Depending on the liquid level, either a greater or a lesser number of electrodes 18 will be immersed and in contact with the liquid.

The unit 12 may comprise a number of separate sections disposed one above another, such sections being shown in FIG. 1 and designated 20, 22, 24 and 26 respectively. The conducting member 14 may thus be constituted of four separate sections in its make up, designated respectively 28, 30, 32 and 34.

By way of example, the upper-most section 20 of the probe immersion unit 12, having the conducting member 28, can further comprise 12 of the electrodes or blades 18, this also being true of the remaining sections 22, 24 and 26 of the probe unit. Thus, a total of 48 of the blades 18 can be utilized, and if each blade has a finite height or vertical dimension of 6 inches, the vertical extent or height of the sections 20–26 would be each 6', four sections representing a total height of 24'.

Lead wires are connected to the electrodes 18, there being 48 such lead wires which can be combined into a single, multiple wire electrical cable designated by the numeral 36. The electrodes are mounted vertically one above the other on suitable insulated supports, and are preferably insulated from one another in the absence of any connecting leads therebetween. The lead wires from the electrodes 18 have been designated by the letters of the alphabet starting with the letter A at the bottom and ending with the double-letter designation VV at the top, this being for the purpose of simplifying the showing of the circuits and connections which are made to the electrodes.

Surrounding the sets of electrodes and conducting members are metal shields 38, 40, 42 and 44, constituting an electrical guard or guard means, these shields being electrically connected together (as are the sections of the members 28–34). From the upright conducting member 14 a lead 46 is brought out, such lead being carried in a shield or conduit designated diagrammatically as 48. The cable 36 comprising the wires from the electrodes 18 is also carried in a conduit or shield which is designated diametrically by the numeral 50.

As provided by the invention, the gauge further comprises a detector means comprising a highly sensitive electronic amplifier 52 having a high impedance input circuit comprising wires or leads 54, 56. The input lead 56 is connected to the lead 46 from the members 28–34 by means of a quick disconnect 58, which latter also connects the shield 48 with a shield 60 for the wire 46. The shield 60 is connected by a wire 62 with an input lead 54 of the amplifier, and also with the output thereof, as shown.

The amplifier 52 may be of the integrated circuit type, and can, for example, be that know commercially by the designation LH0042C. The output lead 64 of amplifier 52 is connected by a wire 66 with the input lead 54, providing a negative feedback arrangement and a voltage amplifier gain of one. The amplifier 52 has positive and negative supply leads 68, 70, which can be normally provided with a potential of 15 volts, plus and minus as shown.

The input wire 56 of the amplifier is connected with a bypass capacitor 72 and biasing resistor 74, the other leads of which extend to ground.

The output from the amplifier 52, constituting the wire 64, is connected to a second (comparator type) amplifier 76 which can also be of the integrated circuit variety. A commercial amplifier having the designation LM311 can be used for the amplifier 76. The lead 64 has a bypass capacitor 78 to ground. The amplifier 76 has a second input lead 80 which is connected through an input resistor 82 to ground and through a bypass capacitor 84 to ground. Also, the input lead 80 is connected with a variable resistor 86 extending to the output lead 88 of the amplifier 76, thereby providing a variable voltage gain to the comparator.

The amplifier 76 has positive and negative supply leads 90, 92 for connection with a suitable d.c. supply providing a 15 volt potential, plus or minus as indicated.

A second output lead 94 from the amplifier 76 is connected through a resistor 96 to a light emitting diode 98 constituting a part of the detector means; the other terminal of the diode is grounded through a wire 100.

By the above arrangement of the amplifiers 52 and 76, the light-emitting diode 98 will be excited and illuminate when the amplifier 52 has an output above a predetermined value. Such output will be attained whenever any of the electrodes 18 is submerged and has impressed on it a uniform positive potential, such potential being sensed by the conducting member 14.

In accordance with the present invention, a unique selecting switch device designated generally by the numeral 102 is provided for supplying a polarizing potential or finite energizing voltage with respect to a fixed reference potential such as ground to any of the electrodes 18 and for simultaneously indicating which of the electrodes has thus been polarized. The switch device 102 is shown as comprising a pair of rotary selector switches 104, 106, comprising respectively wiper blades 108, 110, which are respectively cooperable with sets of arcuately arranged switch contacts 112, 114. The contacts of the rotary switch 104 are brought out to leads, which are designated by the letters of the alphabet starting with the letter A and ending with the letter X. Such leads are connected with the cable 36, and correspond respectively with the similarly lettered leads of the electrodes 18, there being a total of 24 such leads. In an analogous manner, the contacts of the rotary switch 106 are brought out to leads which are lettered starting with the alphabet letter Y and ending with the double-letter designation VV, and these leads are also connected with the cable 36 and join the correspondingly lettered leads that extend to the electrodes 18 in the tank 10.

The invention provides a plurality of high value resistive electrical components, such as fixed resistors 116 which are at all times connected respectively to the electrodes 18 by virtue of having their ends joined respectively to the contacts 112 of the switch. The remaining ends of the resistors 116 are joined to the common output lead wire 64 of the amplifier 52. Likewise, the contacts 114 of the switch 106 are connected to another set of high value resistors 116, whose other ends are connected to the lead wire 64. This second set of resistors 116 is joined through cable 36 to the lead wires starting with Y and ending with the double-letter designation VV, the wires going to the upper two of the sets of electrodes 18 in the tank 10. The switch blade 110 is connected by a wire 120 to a contact 122 of the switch 104. Also, the switch blade 108 is connected through a resistor 124 to a positive polarizing potential of plus 15 volts, obtained from a power supply to be described below.

With the above arrangement, it is seen that proper manipulation of the switches 104, 106 can result in a plus potential being applied to any one of the 48 electrodes 18 located in the tank 10. The liquid in the tank (fuel oil, gasoline, etc.) is characterized by a small but measurable conductance which gives rise to a relationship between the conducting member 14 and a plurality of the upright electrodes 18, depending upon the level of the liquid in the tank. That is, if an electrode to which the potential is applied is submerged in the liquid, the conducting member 14 will sense the applied voltage via a minute but measurable conduction through the liquid, and a drive signal (positive d.c. voltage) will appear at the input lead 56 of the amplifier 52, which in turn will drive the comparator amplifier 76 so as to provide a visual indication by exciting the light-emitting diode 98. The detector means comprising the amplifiers 52, 76 and diode 98 thus respond to the conductive relationship established (through the medium of the liquid) between the conducting member 14 and certain of the electrodes 18. By proper manipulation of the switches 104, 106, it is thus possible to locate that one electrode 18, which is closely adjacent the liquid level in the tank 10 and is in contact with such liquid. This is the switch position (actuating the switch 104 or 106 from right to left to connect the contacts in sequence) which first lights the diode 98 as the blade 108 or 110 traverses the contacts. Thus, by providing a set of numbered scales 130, 132 for the blades 108, 110 respectively, the switch device can indicate where the illumination of the diode commences as the blades sweep across the scale, one after the other from right to left in FIG. 1. This gives a rough indication of the level of the liquid in the tank 10, that is, where a switch position providing illumination is immediately ahead of the next switch position which does not provide illumination. It is to be noted that the scales 130, 132 can be numbered to correspond to a particular number of feet, or inches of depth as the case may be.

The invention further provides for intercalating the readings obtained by the switch indication as obtained above. In accomplishing this, the detector means of the invention further includes a stepless, current-responsive meter or analog indicator device 134 which can be in the form of a milliameter having a calibrated scale of from 0 to 1. The meter preferably has a straight-line response characteristic. The meter 134 also has terminals connected by wires 136, 138 with switch blades 140, 142 which are cooperable with switch contacts 144, 146, 148, 150, 152 and 154. The switch may be of the tandem type having an actuator nob 156 movable over positions labeled "gauge", "+Batt" and "—Batt." The switch contact 144 is connected with a calibrating resistor or device 158 and series resistor 160 which in turn is joined by a wire 162 to the output lead 64 of the amplifier 52. The switch contact 146 is connected through a resistor 164 to the plus output voltage bus from a power supply to be described below. The contact 148 is grounded, as are the contacts 150 and 152. The contact 154 is connected with a resistor 166 which in turn is joined to the negative bus of the power supply.

The calibrating resistor can be set to provide full-scale deflection or other predetermined deflection when the selecting switch 102 has applied potential to a fully submerged electrode or plate, at which time amplifier 52 will provide its maximum output. Then, in operation, partial submergence of the particular electrode or plate will yield a correspondingly lower reading as the meter, giving an accurate indication of the percentage or part of the electrode which is submerged.

With the above organization, with the switch blade 156 in the "gauge" position, the meter 134 is connected through resistors 158, 160 with the output lead 64 of the amplifier 52, and when the particular electrode 18 which is partially submerged has been located by the sweeping the switches 104, 106 from right to left, and observing the first illumination of diode 98, a partial scale reading of the meter can be used to indicate the extent of submersion of the particular plate 18 which is partially submerged. The position of the meter needle thus provides an intercalating effect, by which the liquid level can be determined with great accuracy, even to fractions of an inch, where a plate 18 is only partially submerged in the liquid. Such an analog reading of the meter 134 can be combined with the digital reading of the switches 104, 106 obtained from the scales 130, 132 to provide an extremely accurate indication of the liquid level.

FIG. 2 shows diagrammatically a power supply for use with the circuitry of FIG. 1, comprising a pair of batteries 170, 172 having terminals grounded as shown. The power supply has a positive (+) voltage output terminal 174 and a negative (—) voltage output terminal 176. The output voltages at the terminals 174, 176 are respectively +15 and —15 volts d.c. The battery supply includes a push-button type, master on-off switch 178, relays 180, 182 and an integrated circuit timer 184, as well as sundry resistors and a pilot light 186. The meter 134 is employed to check the positive and negative output voltages of the supply by placing the switch blade 156 in the "+Batt" and "—Batt" positions respectively. Resistors 164 and 166 are suitably chosen to yield a predetermined deflection on the meter corresponding to a correct output voltage level from each supply. The timer 184 removes output voltage from terminals 174, 176 after a short time interval, by opening relays 180, 182, thus preventing extended operation and excessive battery drain. Re-setting of the timer to initially apply power to the system is accomplished by momentarily depressing the push-button switch 178. The power supply of FIG. 2 is of conventional construction, to provide plus and minus voltages on both sides of ground. Further description of the supply is accordingly not given herein.

The operation of the improved liquid level gauge is as follows: The unit is energized initially by depressing push button 178 which latches relays 180 and 182, which in turn apply positive output voltage to terminal 174 and negative output voltage to terminal 176. The selecting switch 102 is initially set such that wiper 108 engages contact 122 and wiper 110 is disposed in its fully clockwise position in FIG. 1. For purposes of discussion, it will be assumed that the tank is roughly three quarters filled with liquid. It is to be noted that the light-emitting diode 98 is not illuminated and that the milliammeter 134 is reading zero. The operator begins to sweep wiper blade 110 counterclockwise, one contact at a time, until such time as the light-emitting diode 98 becomes illuminated. Such counterclockwise sweeping of the blade 110 corresponds to the application of a polarizing potential to the electrodes 18, one at a time, from the upper-most electrode in the tank in a downward direction. As long as the electrode so polarized is above the level of the fluid in the tank, the potential sensed by the upright conducting member 14 will be zero (high value resistor 74 establishes the input voltage on lead 56 of amplifier 52 at ground potential in the absence of a d.c. potential received from the conducting member 14). Continued sweeping of the wiper 110 in a counterclockwise direction will eventually cause voltage to be applied to a plate or electrode 18 which is wholly or partially submerged. When this occurs, the upright conducting member will sense a positive potential from this submerged, energized blade via a minute but measurable conductivity of the liquid being gauged. Thus results in a drive signal being applied to the amplifier 52, which actuates the comparator 76, and thus illuminates the light-emitting diode 98.

The operator now reads the dial or scale 132 to obtain a rough, digital indication of the liquid level. The degree of submergence of the particular electrode in question will be reflected by the magnitude of the potential being applied to line 56 of the amplifier 52. This analog signal is effectively transferred to the output of the amplifier 52 (line 162) since the amplifier 52 has unity voltage gain. The meter 134 thus responds to a voltage which is proportional to the percentage or part of the electrode which is submerged, and thus gives a fine indication or interpretation of the level between the relatively rough reading obtained from the dial 132.

Assuming that the tank had been one quarter full, the operator would have swept the blade 110 to its fully counterclockwise position without observing any illumination from the light-emitting diode, and proceeded further by sweeping the blade 108 counterclockwise until a point was reached wherein the light-emitting diode 98 became illuminated. It is to be understood that other multi-contact switch constructions would operate equally as well, and the invention is not to be restricted in scope to the use of multiple rotary switches. The timer 184 would automatically remove power from the unit in a short time period, sufficiently adequate to obtain readings. Thus excessive battery drain is avoided.

It is to be noted that the resistors 116 and switch 102 are so connected as to apply a biasing voltage equal to the output voltage of amplifier 52 (lead 66) to all of the electrodes 18 except that single electrode which is being polarized. This insures that the wholly submerged electrodes are maintained at the same potential as the guard member sections 38, 40, 42, 44 (the guard member being maintained at a potential equal to the output voltage on lead 66 of amplifier 52). Such a condition is desirable so as not to introduce undesirable gradients in the fluid at the vicinity of the conducting member 14; such gradients would adversely influence the potential sensed by the member 14, and would thus disrupt proper operation of the system. It is noted that the amplifier 52 is merely a high input impedance voltage follower; the output voltage appearing on lead 66 closely follows the input voltage applied to line 56 (to within several millivolts). Both the input impedance of the amplifier 52 and the resistance of resistor 74 are sufficiently high so as to cause negligible loading on the minute-current signal received from the conducting member 14.

It will now been understood from the foregoing that I have provided a novel and unique liquid level gauging apparatus having a number of distinct advantages. The gauging is independent of the liquid density or conductivity, and a determination of the level can be made with high accuracy to within fractions of an inch in a large tank or reservoir typically containing thousands of gallons of liquid. Assuming the use of 48 plates or electrodes, the digital reading provides a resolution of about 2%. Adding to this reading an additional analog resolution to within 10% of the reading of the fractional part of the partially submerged plate, yields an overall resolution of 0.2% which is extremely good compared to the accuracy of all prior systems heretofore known. The system as illustrated is especially simple, unique in construction and readily adapted to existing tank facilities or installations. The cost is low, and all parts with the exception of the immersion unit can be located remotely from the tanks.

Variations and modifications are possible without departing from the spirit of the invention.

I claim:

1. A liquid-level gauge comprising, in combination:
    a. an upright conducting probe adapted for contact at a multiplicity of levels with the liquid to be gauged,
    b. an upright row of electrodes insulated from each other and adapted for immersion in said liquid in proximity to said probe,
    c. means for successively applying to said electrodes a finite energizing voltage with respect to a fixed reference potential, and for simultaneously indicating any electrodes thus energized,
    d. voltage responsive detector means having a voltage sensitive input terminal connected to said probe for sensing potential therefrom as the energizing voltage is applied to the electrodes, said detector means providing an indicating output signal in response to energization of an electrode which is at least partially submerged in the liquid, and
    e. means for maintaining any electrodes which are not energized by the energizing voltage at a potential substantially equal to the potential of the conducting probe.

2. The invention as defined in claim 1, wherein: a. said voltage applying means comprises a switching device for successively applying the energizing voltage to the electrodes.

3. The invention as defined in claim 1, and further including:
    a. an electrical guard comprising a conducting cylinder encircling said conducting probe and said electrodes, and
    b. means electrically connecting said guard to said detector means.

4. The invention as defined in claim 1, wherein:
    a. the detector means comprises a high input impedance amplifier having an input terminal connected with the conducting member, and further having an output terminal.

5. The invention as defined in claim 4 wherein:
    a. the detector means further includes an electrical indicating meter connected to the output terminal of the amplifier.

6. The invention as defined in claim 4 wherein:
a. an input terminal of the amplifier is connected to the output circuit thereof to provide a feedback control for the amplifier.

7. The invention as defined in claim 1, wherein:
a. said detector means comprises an amplifier and an electrically energized light source powered by said amplifier, for providing visual indications as the switching device successively applies potential to the electrodes.

8. The invention as defined in claim 7, wherein:
a. said electrically energized light source comprises a light-emitting diode.

9. A liquid-level gauge comprising, in combination:
a. an upright, conducting probe adapted for contact at a multiplicity of levels with the liquid to be gauged,
b. an upright row of electrodes insulated from each other and adapted for immersion in said liquid in proximity to said probe,
c. a voltage responsive power amplifier having voltage sensitive high impedance input circuitry and input terminals associated therewith, and having a lower impedance output circuit,
d. an electric indicator in said output circuit, responsive to the output power of the amplifier,
e. said upright conducting probe being connected to one of said input terminals,
f. a plurality of high-value resistors connected respectively to the electrodes of said row and having a common lead connected to the output circuit of said amplifier, and
g. means including a selecting switch device for successively applying to said electrodes a finite polarizing potential with respect to a fixed reference potential and for simultaneously indicating any electrode thus polarized, said indicator providing a signal in response to application of a polarizing potential to an electrode which is at least partially submerged in the liquid.

10. A liquid-level gauge as in claim 9, wherein:
a. the electric indicator comprises a current-responsive meter, for measuring the current output of the power amplifier.

11. A liquid-level gauge as in claim 9, wherein:
a. the selecting switch device comprises a rotary switch blade and a pointer connected therewith, arcuately arranged contacts cooperable with the blade and connected with the electrodes, respectively, and a graduated scale over which the pointer travels.

12. A liquid-level gauge as in claim 9, wherein:
a. the selecting switch device comprises a pair of rotary switch blades and pointers connected therewith, two sets of arcuately arranged contacts cooperable respectively with said blades, and a pair of graduated scales over which the pointers respectively travel,
b. one of said rotary switch blades being electrically connected to a contact of the set which is associated with the other switch blade.

13. A liquid level gauge as in claim 9, and further including:
a. an electrical guard comprising a conducting cylinder encircling said conducting probe and said upright row of electrodes, and
b. means electrically connecting said guard to the output circuit of the amplifier.

14. A liquid level gauge as in claim 13, and further including:
a. an electrical lead extending from the conducting probe to said one input terminal, and
b. a tubular shield disposed around said lead, constituting the means which connects the guard to the amplifier output circuit.

15. A liquid level gauge as in claim 9, and further including:
a. an electrically-energized light source, and
b. power means connected to said light source and to the output of the amplifier, for operatively energizing said source when the amplifier output attains a predetermined level.

16. A liquid level gauge as in claim 9, wherein:
a. the means for applying a polarizing potential comprises a battery power supply providing positive and negative potentials, and
b. means for energizing the power amplifier with said positive and negative potentials from the battery supply.

17. A liquid level gauge as in claim 9, wherein:
a. said indicator comprises a meter, and includes means connected to said meter, providing for full scale deflection of the latter when the switch device is supplying potential to any electrode which is fully immersed in the liquid being gauged.

18. A liquid level gauge as in claim 17, wherein:
a. the indicator has a zero reading when the switch device is supplying potential to any electrode not contacting the liquid being gauged,
b. said indicator having a straight line response characteristic.

19. A liquid level gauge as in claim 18 and further including:
a. a calibration device connected in circuit with said indicator, for establishing a predetermined setting of the same for positions of the switch device which supply potential to an electrode which is completely submerged in the liquid.

20. A liquid level gauge as in claim 9 and further including:
a. means connecting the amplifier output circuit to said other input terminal, providing a feedback thereto.

21. A liquid level gauge as in claim 20, and further including:
a. an electrical guard shielding said conducting member and upright row of electrodes, and
b. means connecting said guard to the amplifier output circuit.

22. In a liquid storage installation, in combination:
a. a storage tank having a large body of liquid stored therein,
b. an upright, electrically conducting probe immersed in said body of liquid and adapted for contact at a multiplicity of levels with the liquid to be gauged, said probe assuming a finite potential by virtue of said immersion in the liquid,
c. a probe device cooperable with said probe, said probe device comprising an upright row of electrodes insulated from each other and adapted for immersion in said body of liquid in proximity to said first-mentioned probe.

d. means for applying an energizing voltage to said electrodes in succession.
e. said liquid being characterized by the property of establishing a cooperable relationship between said conducting probe and different, consecutively higher or consecutively lower electrodes as the level of the body of liquid in the tank respectively rises or falls,
f. voltage responsive detector means having a voltage sensitive input terminal connected with said probe and being responsive to said relationship, designating which of the said electrodes is or are involved in said relationship, thereby to provide an indication of the level of the liquid in the tank, and
g. means for maintaining any electrodes which are not energized by the energizing voltage at a potential substantially equal to the potential assumed by the conducting probe.

23. The invention as defined in claim 22, wherein:
a. said cooperable relationship comprises the conductance of the liquid.

24. The invention as defined in claim 23, wherein:
a. said detector means comprises means for applying energizing voltages to some of said electrodes.

25. The invention as defined in claim 24, wherein:
a. said applying means comprises a switching device for successively applying the energizing voltages to said electrodes,
b. said detector means comprising an amplifier and indicator connected with said upright conducting probe.

26. The invention as defined in claim 25, wherein:
a. said switching device includes means for indicating which of said electrodes is energized at any given time.

27. The invention as defined in claim 22 and further including:
a. an electrical guard comprising a conducting cylinder encircling said conducting probe and said cooperable probe device, and
b. means electrically connecting said guard to said detector means.

28. The invention as defined in claim 22 wherein:
a. the detector means comprises a high input impedance amplifier having an input terminal connected with the conducting probe, and further having an output terminal, and
b. an electrical indicating meter connected to said output terminal.

29. The invention as defined in claim 22, wherein:
a. an electrical guard comprising a conducting cylinder encircling said conducting probe and said cooperable probe device, and
b. electronic means for maintaining said guard at substantially the same potential as that sensed by the conducting probe 30. A liquid-level gauge comprising, in combination:
a. an upright conducting probe adapted for contact at a multiplicity of levels with the liquid to be gauged,
b. an upright row of electrodes insulated from each other and adapted for immersion in said liquid in proximity to said probe,
c. means for successively applying to said electrodes a finite energizing voltage with respect to a fixed reference potential, and for simultaneously indicating any electrodes thus energized,
d. means independent of the liquid being gauged, and including polarized circuits connected with the electrodes, for maintaining any of the latter, which are not energized by the energizing voltage, at a potential substantially equal to the potential of the conducting probe,
e. voltage responsive detector means having a voltage sensitive input terminal connected to said probe for sensing potential therefrom as the energizing voltage is applied to the electrodes, said detector means providing an indicating output signal in response to energization of an electrode which is at least partially submerged in the liquid,
f. an electrical guard comprising a conducting cylinder encircling said conducting probe and said electrodes, and
g. low impedance electronic means for maintaining said guard at substantially the same potential as that sensed by the conducting probe.

31. The invention as set forth in claim 30 and further including:
a. conductive means for maintaining any electrodes which are not energized by the energizing voltage at a potential substantially equal to the potential of the conducting probe.

32. The invention as set forth in claim 32, wherein:
a. said conductive means comprises a plurality of high value resistors connected respectively to said electrodes.

33. The invention as defined in claim 30, wherein:
a. said detector means comprises an amplifier having an input terminal connected with said conducting probe device and a meter connected to said amplifier.
b. said electrodes having a finite vertical dimension, respectively, such that when a particular electrode is polarized and partially submerged, the potential sensed by the conducting probe device and hence the meter reading varies as a function of the degree of submergence of the particular electrode.

34. The invention as defined in claim 33, wherein:
a. the amplifier has a unity voltage gain.

* * * * *